United States Patent
Samuelsson et al.

(10) Patent No.: US 10,306,239 B2
(45) Date of Patent: May 28, 2019

(54) METHODS, SOURCE DEVICE, TARGET DEVICE AND ANALYSER FOR MANAGING VIDEO CODING

(71) Applicant: Telefonaktiebolaget L M Ericsson (publ), Stockholm (SE)

(72) Inventors: Jonatan Samuelsson, Stockholm (SE); Magnus Westerlund, Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 14/436,750

(22) PCT Filed: May 13, 2014

(86) PCT No.: PCT/SE2014/050581
§ 371 (c)(1),
(2) Date: Apr. 17, 2015

(87) PCT Pub. No.: WO2015/174894
PCT Pub. Date: Nov. 19, 2015

(65) Prior Publication Data
US 2016/0198161 A1   Jul. 7, 2016

(51) Int. Cl.
*H04N 19/166*   (2014.01)
*G06F 11/10*   (2006.01)
(Continued)

(52) U.S. Cl.
CPC ........... *H04N 19/166* (2014.11); *G06F 11/10* (2013.01); *H04N 19/105* (2014.11);
(Continued)

(58) Field of Classification Search
CPC ..... H04N 19/166; H04N 21/236; G06F 11/10
(Continued)

(56) References Cited

U.S. PATENT DOCUMENTS 7,487,423 B2 *  2/2009  Lobo .................... H03M 13/63
                                                             375/224
9,311,187 B2 *  4/2016  Resch ................. G06F 11/1092
(Continued)

OTHER PUBLICATIONS

H265—Audiovisual and multimedia system infrastructure of audio-visual services—Coding and moving video; Apr. 2013.*
(Continued)

*Primary Examiner* — Luis Perez-Fuentes
(74) *Attorney, Agent, or Firm* — Baker Botts, LLP

(57) ABSTRACT

Methods, target device (120) and source device (110) for managing error in a decoded picture of a coded video sequence "CVS" as well as method and analyzer (130) for managing a feedback message for indication of the error are disclosed. The target device (120) receives (204) a first DPH and calculates (205) a second DPH and detects (206) the error by finding that the first DPH is different from the second DPH. The target device (120) sends (207) a feedback message to the source device (110) or fetches (211) pictures of a further CVS from the source device (110) in response to the detection of the error. The source device (110) receives (208) the error message and changes (210) configuration for encoding of pictures based on the error message. The analyzer (130) receives (214) the feedback message and classifies (216) a mismatch, identified by the feedback message, into a category based on the feedback message. The analyzer (130) sends (217) a mismatch message indicating the category. Computer programs and carriers are disclosed.

12 Claims, 7 Drawing Sheets

(51) Int. Cl.
*H04N 21/2343* (2011.01)
*H04N 21/4425* (2011.01)
*H04N 21/462* (2011.01)
*H04N 21/845* (2011.01)
*H04N 19/105* (2014.01)
*H04N 19/172* (2014.01)
*H04N 19/895* (2014.01)

(52) U.S. Cl.
CPC ......... *H04N 19/172* (2014.11); *H04N 19/895* (2014.11); *H04N 21/23439* (2013.01); *H04N 21/4425* (2013.01); *H04N 21/4622* (2013.01); *H04N 21/8456* (2013.01)

(58) Field of Classification Search
USPC ................................................. 375/240.27
See application file for complete search history.

(56) References Cited

U.S. PATENT DOCUMENTS

| | | | | |
|---|---|---|---|---|
| 9,332,309 | B2* | 5/2016 | Leontaris | H04N 21/44209 |
| 9,516,335 | B2* | 12/2016 | Chernyshev | H04N 19/147 |
| 9,641,862 | B2* | 5/2017 | Hannuksela | H04N 19/119 |
| 9,794,649 | B2* | 10/2017 | Denoual | H04N 21/234327 |
| 9,872,043 | B2* | 1/2018 | Esenlik | H04N 19/70 |
| 2007/0240191 | A1 | 10/2007 | Singh et al. | |
| 2008/0037656 | A1* | 2/2008 | Hannuksela | H04N 21/23614 375/240.26 |
| 2008/0181228 | A1* | 7/2008 | Hannuksela | H04N 21/234327 370/394 |
| 2012/0297464 | A1* | 11/2012 | Busch | G06F 11/1008 726/5 |
| 2014/0307771 | A1* | 10/2014 | Hemmendorff | H04N 19/00206 375/240.02 |
| 2015/0103927 | A1* | 4/2015 | Hannuksela | H04N 19/597 375/240.26 |
| 2016/0198161 | A1* | 7/2016 | Samuelsson | H04N 21/23439 375/240.27 |
| 2016/0337672 | A1* | 11/2016 | Lee | H04N 21/236 |
| 2017/0085878 | A1* | 3/2017 | Sole Rojals | H04N 19/124 |

OTHER PUBLICATIONS

RTP—A Transport Protocol for Real-Time Applications; Casner; 2003.*
Overview of HEVC High-Level Syntax and Reference Picture Mangt; Sjorberg; Jan. 2012.*
H265—Audiovisual and multimedia system infrastructure of audio-visual services—Apr. 2013; (Year: 2013).*
Overview of HEVC High-Level Syntax and Reference Picture Management; Sjorberg; Jan. 2012; (Year: 2012).*
Codec Control Message in RTP audio-visual Profile with Feedback AVPF; Chandra; 2008; (Year: 2008).*
SDP—Session Description Protocol; Perkins; 2006; (Year: 2006).*
Google Search for NPL; 2019; (Year: 2019).*
SIP: Session Initial Protocol by J. Rosenberg et al., Jun. 2002.
RTP: A Transport Protocol for Real-Time Applications by H. Schulzrinne et al., Jul. 2003.
RTP Control Protocol Extended Reports (RTCP XR) by T. Friedman, Ed., et al., Nov. 2003.
SDP: Session Description Protocol by M. Handley et al., Jul. 2006.
Extended RTP Profile for Real-time Transport Control Protocol (RTCP)—Based Feedback (RTP/AVPF) by J. Ott et al., Jul. 2006.
Codec Control Messages in the RTP Audio-Visual Profile with Feedback (AVPF) by S. Wenger et al., Feb. 2008.
Series H: Audiovisual and Multimedia Systems; High efficiency video coding, Apr. 2013.
PCT Notification of Transmittal of the International Search Report and the Written Opinion of the International Searching Authority, or the Declaration for International application No. PCT/SE2014/050581, dated Sep. 18, 2014.

* cited by examiner

METHODS, SOURCE DEVICE, TARGET DEVICE AND ANALYSER FOR MANAGING VIDEO CODING

PRIORITY

This nonprovisional application is a U.S. National Stage Filing under 35 U.S.C. § 371 of International Patent Application Serial No. PCT/SE2014/050581, filed May 13, 2014, and entitled "METHODS, SOURCE DEVICE, TARGET DEVICE AND ANALYSER FOR MANAGING VIDEO CODING."

TECHNICAL FIELD

Embodiments herein relate to video coding. In particular, a method and a target device for managing an error detected in a decoded picture of a coded video sequence, a method and a source device for handling an error message relating to an error in a decoded picture of a coded video sequence as well as a method and an analyser for managing a feedback message for indication of an error in a picture of a coded video sequence are disclosed. Moreover, corresponding computer programs and computer program products are disclosed.

BACKGROUND

With video coding technologies, it is often desired to compress a video sequence into a coded video sequence. The video sequence may for example have been captured by a video camera. A purpose of compressing the video sequence is to reduce a size, e.g. in bits, of the video sequence. In this manner, the coded video sequence will require smaller memory when stored and/or less bandwidth when transmitted from e.g. the video camera. A so called encoder is often used to perform compression, or encoding, of the video sequence. Hence, the video camera may comprise the encoder. The coded video sequence may be transmitted from the video camera to a display device, such as a television set (TV) or the like. In order for the TV to be able to decompress, or decode, the coded video sequence, it may comprise a so called decoder. This means that the decoder is used to decode the received coded video sequence. In other scenarios, the encoder may be comprised in a network node of a cellular communication system and the decoder may be comprised in a wireless device, such as a cellular phone or the like, and vice versa.

A known video coding technology is called High Efficiency Video Coding (HEVC), which is a new video coding standard, currently being developed by Joint Collaborative Team-Video Coding (JCT-VC). JCT-VC is a collaborative project between Moving Pictures Expert Group (MPEG) and International Telecommunication Union's Telecommunication Standardization Sector (ITU-T).

Furthermore, VP8 is a known proprietary video coding technology.

Common for the above two video coding technologies is that they use a previously decoded picture for reference when decoding a current picture and that the encoder and decoder will keep bit-exact versions of some of these decoded pictures, called reference pictures, so as to avoid that any difference occurs between the encoder and the decoder, a.k.a. drift.

Pictures that do not use previously decoded pictures for reference are called intra pictures. Intra pictures can be used to reset the state of the decoder for example in order to recover from errors that have occurred in previously decoded pictures. In HEVC, intra pictures that do not allow pictures that follow the intra picture in output order to be reference pictures before the intra picture are called IRAP (Intra Random Access Point) pictures.

An HEVC bitstream, e.g. in the form of a Coded Video Sequence (CVS), includes one or more Network Abstraction Layer (NAL) units. A picture may be included in one or more NAL units. A bitstream comprises of a sequence of concatenated NAL units. A NAL unit type is transmitted in the nal_unit_type codeword in a NAL unit header, 2 bytes in HEVC. The NAL unit type indicates how the NAL unit should be parsed and decoded. There exist two types of NAL units: VCL (video coding layer) NAL units and non-VCL NAL units. One example of non-VCL NAL units is Supplemental Enhancement Information (SEI) messages. These messages contain meta data that does not affect the actual decoding process of video data. A particular SEI message is called Decoded Picture Hash (DPH) SEI message, which is specified in HEVC specification, section D.2.19 and D.3.19. The DPH SEI message defines three methods for calculating a hash, or DPH value, over a decoded picture, which in the encoder is also referred to as the reconstructed picture: Message-Digest algorithm 5 (MD5), Cyclic Redundancy Check (CRC) and checksum. Which of them is used is indicated by the syntax element hash_type of the DPH SEI message.

Video Transport is done in various ways; two commonly used methods are Real-Time Transport Protocol (RTP) for real-time, often interactive communication, and Hypertext Transfer Protocol (HTTP) based video streaming for content services, serving video on demand. The real-time ways will be discussed first and then the HTTP based video streaming ways.

The RTP/Real-Time Control Protocol (RTCP), see Request For Comments (RFC) 3550, is a real-time media transport framework that provides various tools suitable for dealing with low-delay interactive video communication. These tools include feedback explicitly related to video coding and used to influence the video encoder. Below we shortly discuss some of these existing tools:

Reference Picture Selection Indication (RPSI), see RFC4585, is used by a receiver to indicate to a video encoder, please use this video picture as reference picture when encoding the next picture. It is used in the HEVC RTP payload format for the purpose of selecting another reference picture when a picture has been detected as erroneous. The VP8 RTP payload format uses RPSI also in an acknowledgment (ACK) mode, where it ACKs the reception of VP8's "golden" pictures, i.e. key reference pictures.

Slice Loss Indication (SLI), see RFC4585, is used, by the receiver, to report that a part of the video picture's encoded data, i.e. a slice is missing, or lost. Thus enabling the video encoder to either repair this loss immediately or take the video decoders concealment into account when encoding the next video picture.

Picture Loss Indication (PLI), see RFC4585, is used, by the receiver, to inform that it is has an error or is missing an unspecified part of the video picture. The encoder is expected to as timely as possible to repair this, by its choice of method.

Full Intra Request (FIR), see RFC5104, is a request to receive a video picture (intra) that isn't dependent on any previous state, i.e. a picture without any inter picture dependencies.

An RTP payload format is a specification for how a particular real-time media encoder is packetized within RTP.

An example of a HTTP based streaming media method is progressive download or adaptive streaming, such as Dynamic Adaptive Streaming over HTTP (DASH). As an example, a client, e.g. using JavaScript running in a browser, requests to download a video file. In progressive download, the client starts decoding the video file prior to having downloaded the entire video file. Adaptive streaming is similar and is either range based, or chunk based. In a range based case, the client continues to download a file as long as the adaptation logic doesn't have it change which representation, i.e. encoding, of the media content it should retrieve. When changing representation, it uses meta information to calculate the byte offset into the file with the representation it needs to continue to download. In a chunk based case, the entire video file is partioned into chunks, typically a few seconds, e.g. 10 s. Each chunk is encoded into different representations and each representation of the chunk is commonly stored in a separate file. By requesting different representations of the chunks, the adaptive client can change the bit-rate as well as other variations, like codecs that there exist encoded representations for.

Thus, in a first scenario, a video system uses RTP for transfer of video data between one or more encoder(s) and one or more decoder(s) of the system. The encoder(s) and decoder(s) are assumed to be compliant and compatible with e.g. a HEVC standard specification. However, errors are prone to happen. A reason for that is the high demands on compression efficiency of modern codecs, which thus allow for very little redundancy.

The errors in video decoding have two major sources.

The first source is data errors in the encoded video data feed as input to the decoder. These errors can be introduced at any stage between the encoder's output and the decoder's input. Transport over an IP-network, like the Internet is one potential cause for these errors, primarily when the data's integrity isn't verified by the receiver. These errors occur even over "reliable" transports like TCP that has some (but weak) error detection capabilities. Other causes for errors are the hardware, where memory or storage without strong verification can introduce bit-errors or other modifications.

The second source for errors is errors in the encoding process or in the decoding process. These are not supposed to be there, but both an encoder and a decoder is an implementation of a standard. This means that there may be errors in both the interpretation of the standard, as well as in the implementation.

Some of the errors do result in that the decoder itself detects them, for example a value that is not allowed, or output values that are out-of-bounds. This indicates to the decoder that the decoding of this video picture failed to some degree. However, in other cases the decoder does not detect these, and outputs a video picture and continues to use the corrupted state to decode further images. These later errors thus can pass the decoding and significantly lower the video quality for significant durations.

HEVC does provide a tool that if used allows the decoder to detect if the decoded video picture includes errors or matches what the encoder intended it to be, i.e. the DPH SEI message. When the error has been detected by means of the DPH SEI message, a problem may be how to improve performance of the video system.

Systems using video is frequently monitored so that the operator of the system can verify its function and detect faults or issues. This monitoring is done using a large set of different tools, some standardized, some proprietary. The fundamental function is that clients or servers monitor key performance indicators (KPI). Each KPI is one or several properties that can be measured and for which snapshot of values, or statistical processed summary values can be determined over intervals or usage session. This statistical processing includes averages and standard deviation. For an RTP based system some common KPI includes packet loss rate, burst loss sizes, round-trip times.

These values are then usually gathered and stored in a database to allow follow up of communication sessions that indicates sub-standard KPI values. This gathering can be done in various ways, such as Management Information Base, WebRTC JavaScript Statistics API, in central servers or network functions, such as RTP mixers or Session Border Gateways.

In systems using RTP and RTCP, there exists a number of KPIs that can be provided over RTCP to the peer or RTP mixer/translator. The basic things are included in the RTCP Receiver Report Block, see RFC3550, while more detailed statistics can be provided using RTCP Extended Reports, see RFC3611, which has extensible model for additional performance indicators.

Thus, in a second scenario, a video system comprises one or more encoders and one or more decoders. It is desired to test and verify compatibility of the video system with respect to a certain standard specification, such as HEVC mentioned above. This kind of testing and verification is very time consuming and costly, since large amounts of input needs to be run through both the encoder(s) and decoder(s). The testing is thus highly dependent on the input, and based on the enormous amount of possible permutations of video input, state, introduced errors etc. is very difficult, or even almost impossible, to fully verify the video system to be compatible and compliant to 100%. A problem may hence be how to reduce time and cost for testing and verification of compatibility.

The capabilities of both encoder and the decoders are commonly signalled to let the counter part know capabilities or request or require particular features to be enabled in the counter part as well as the media transport. For RTP based systems the most commonly used signalling is based on Session Description Protocol (SDP), see RFC 4566. The SDP may be part of Session Initiation Protocol (SIP) messages, see RFC 3261.

SUMMARY

An object is to overcome, or at least reduce, the above mentioned problems.

According to a first aspect, the object is achieved by a method, performed by a target device, for managing an error detected in a decoded picture of a coded video sequence (CVS), wherein the CVS is provided by a source device. The target device receives a picture of the CVS from the source device. The target device receives a first DPH for the picture from a DPH SEI message of the CVS. The target device calculates a second DPH for the picture. The target device detects the error by finding that the first DPH is different from the second DPH. Next, the target device sends a feedback message to the source device in response to the detection of the error, or the target device fetches pictures of a further CVS from the source device in response to the detection of the error, wherein the further CVS is a second representation being different from a first representation of the CVS related to the received picture.

According to a second aspect, the object is achieved by a method, performed by a source device, for handling an error message relating to an error in a decoded picture of a CVS, encoded by the source device and sent from the source device to a target device. The source device receives, from the target device, the error message, wherein the error message comprises a feedback message, or a mismatch message indicating a category of the error. The source device changes configuration for encoding of pictures based on the error message.

According to a third aspect, the object is achieved by a method, performed by an analyser, for managing a feedback message for indication of an error in a picture of a CVS, wherein the source device is configured to encode and send the CVS, included in a transmission, to a target device in a session. The analyser receives the feedback message and any existing further feedback messages, which indicates that the error has been detected by the target device. The analyser obtains information about the session and the transmission. The analyser classifies a mismatch, identified by the feedback message, into a category based on the information about the session and the transmission as well as the feedback message. Then, the analyser sends a mismatch message indicating the category.

According to a fourth aspect, the object is achieved by a target device configured to manage an error detected in a decoded picture of a CVS, wherein the CVS is provided by a source device. The target device is configured to receive a picture of the CVS from the source device, receive a first DPH for the picture from a DPH SEI message of the CVS, calculate a second DPH for the picture, and detect the error by finding that the first DPH is different from the second DPH. The target device is further configured to send a feedback message to the source device in response to the detection of the error, or to fetch pictures of a further CVS from the source device in response to the detection of the error, wherein the further CVS is a second representation being different from a first representation of the CVS related to the received picture.

According to a fifth aspect, the object is achieved by a source device configured to handle an error message relating to an error in a decoded picture of a CVS, encoded by the source device and sent from the source device to a target device, wherein the source device is configured to receive, from the target device, the error message. The error message comprises a feedback message, or a mismatch message indicating a category of the error. Furthermore, the source device is configured to change configuration for encoding of pictures based on the error message.

According to a sixth aspect, the object is achieved by an analyser configured to manage a feedback message for indication of an error in a picture of a CVS, wherein the source device is configured to encode and send the CVS, included in a transmission, to a target device in a session. The analyser is configured to receive the feedback message and any existing further feedback messages, which indicates that the error has been detected by the target device. Furthermore, the analyser is configured to obtain information about the session and the transmission. The analyser is further configured to classify a mismatch, identified by the feedback message, into a category based on the information about the session and the transmission as well as the feedback message. Moreover, the analyser is configured to send a mismatch message indicating the category.

According to further aspects, the object is achieved by computer programs and carriers for computer programs corresponding to the aspects above.

With respect to the first scenario mentioned in the background section, the target device sends a feedback message to the source device in response to the detection of the error. The feedback message may indicate that the error has been detected, or it may indicate an instruction to the source device, e.g. the feedback message may comprise FIR and/or RPSI. The instruction may specify to the source device how to encode the CVS. The feedback message may in some examples merely indicate that the error exists, or that the error does not exist. In response to, and dependent on, the feedback message, the source device changes configuration for encoding of pictures. As a result, the target device instructs the source device to send a CVS that may be correctly decoded by the target device.

Alternatively, the target device fetches pictures of a further CVS from the source device in response to the detection of the error. The further CVS is a second representation being different from a first representation of the CVS related to the received picture. In this manner, the target device chooses the second representation, which may be correctly decoded by the target device. An advantage of this alternative is that the source device need not be specifically adapted to cooperate with the target device. This means that the source device may in this scenario be known in the art.

With respect to the second scenario mentioned in the background section, the analyser receives at least the feedback message. Then, the analyser classifies a mismatch, identified by the feedback message, into a category based on the information about the session and the transmission as well as the feedback message. The feedback message may comprise information relating to the error based on comparison between the first and second DPH. Then, the analyser sends a mismatch message indicating the category. In this manner, the analyser may classify the error into the category and take necessary actions based upon the category.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
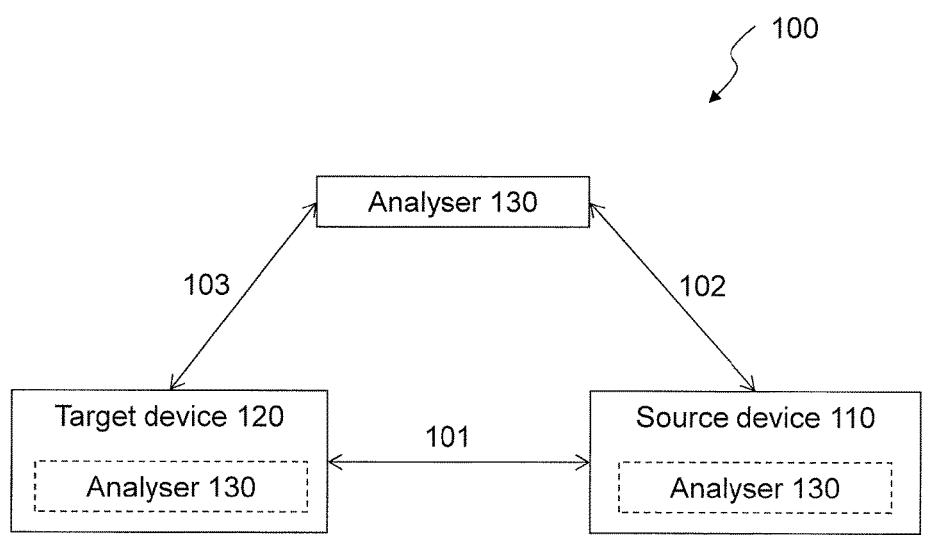
FIG. 1 is a schematic overview of an exemplifying system in which embodiments herein may be implemented.

Throughout the following description similar reference numerals have been used to denote similar elements, units, modules, circuits, nodes, parts, items or features, when applicable. In the figures, features that appear in some embodiments are indicated by dashed lines.

FIG. 1 depicts an exemplifying system 100 in which embodiments herein may be implemented. In this example, the system 100 comprises a source device 110, a target device 120 and an analyser 130. The source device 110 may include an encoder and the target device 120 may include a decoder. The source device 110 and/or the encoder may be implemented in hardware or software or a combination thereof. The target device 120 and/or the decoder may be implemented in hardware or software or a combination thereof. Likewise, the analyser may be implemented in hardware or software or a combination thereof.

The source device 110, the target device 120 and/or the analyser 130 may be comprised in various platforms, such as television set-top-boxes, video players/recorders, video cameras, Blu-ray players, Digital Versatile Disc (DVD)-players, media centers, media players, user equipments and the like. As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be a microphone, a loudspeaker, a camera sensor etc.

As mentioned, the source device 110 may typically include a so called encoder for encoding of video data into a bitstream, such as one or more CVSs. Similarly, the target device 120 may typically include a so called decoder for decoding of the bitstream into pictures to be e.g. displayed on e.g. a TV or the like. The analyser 130 may be an analyser device. As illustrated in the figure, the analyser may be included in the source device 110 and/or the target device 120.

As an example, the source device 110 may send 101, over a wired or wireless connection, a bitstream to the target device 120. The bitstream may be video data, e.g. in the form of one or more NAL units. The video data may thus for example represent pictures of a video sequence. In case of HEVC, the bitstream comprises a coded video sequence that is HEVC compliant. More generally, the source device 110 is able to communicate 101 in both directions with the target device 120. Likewise, the source device 110 is able to communicate 102, over a wired or wireless connection, with the analyser 130. Primarily, the analyser may be required to be able to receive information from the target device 120 and to send information to the source device 110. However, communication is both directions may also be possible in some cases.

Furthermore, the target device 120 is able to communicate 103, over a wired or wireless connection, in both directions with the analyser 130.

In a RTP system, as an example of the system 100 above, the usage of the HEVC decoded picture hash (DPH) according to some embodiments herein, makes it possible to address error cases that could previously not be detected. The use of the DPH not only allows one to detect the error, it also enables the source device 110 to consider the encoder-to-decoder-incompatibilities and avoid using encoding tools that appear to be causing issues, and select to use a more basic set of tools that has no or less issues. Furthermore, some embodiments herein enable generation of system wide statistics for which encoder and decoder combinations that appear to have some issues with being standards compliant, and request implementers of these tools to correct these issues to improve the video quality.

The components in the system can be commonly configured to operate as discussed here. However, in a number of system realizations there are benefits in performing signalling or negotiation to determine the target and/or source device capabilities, and then configure the usage of DPH in the CVS depending on the capabilities to utilize the DPH as well as the existance of suitable feedback messages and/or mismatch message to the relevant devices, i.e. analyzer and source device. This is described in more detail with reference to FIG. 2b.

Briefly, the system 100 may be operated as follows in one example, further examples are illustrated subsequently. The target device 120 after having decoded the video picture calculates the hash value over its decoded picture and compares it to the one included in the encoded video stream for that picture. If it matches, the target device 120 knows it is correct. If the hashes don't match, then some error has been introduced. Disregarding known reasons for corruption of the video picture, like determined packet loss, the target device 120 reports the hash mismatch using a feedback message, e.g. an RTCP feedback indication, which indicates that this is a hash mismatch that can't be explained and reported in other ways. Using a current method for repairing the picture, like RTCP PLI or FIR, would only resolve the immediate issue of correcting the video, not enable the additional advantages described below, but is a possibility if there are issues with deploying a feedback message comprising information relating to one or more DPH values. Such information may be the actual hash value calculated in the target device. The information may also be a flag, or identifier, indicating whether or not there is a match or mismatch for the picture.

The feedback message may include an identification of a picture to make it clear which picture that failed to be correctly decoded. The source device, when receiving this message first addresses the immediate video error as explained below with reference to FIG. 2.

Figure 2A:
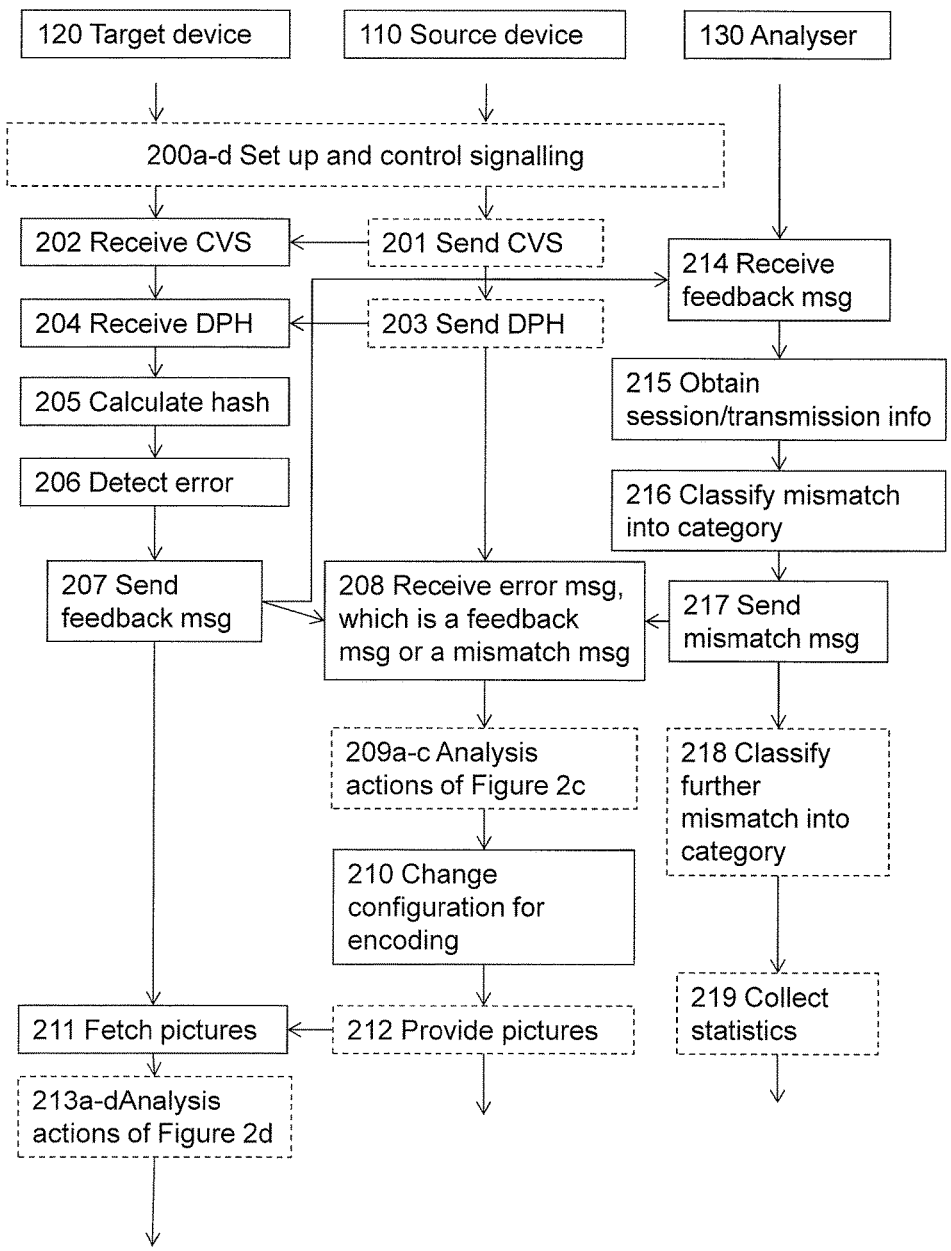
FIG. 2a is a schematic, combined signalling scheme and flowchart illustrating embodiments of the methods when performed in the system according to FIG. 1.

FIG. 2a illustrates exemplifying methods according to embodiments herein when implemented in the source device 110, the target device 120 and the analyser 130, respectively of the system 100 of FIG. 1.

The target device 120 performs a method for managing an error detected in a decoded picture of a coded video sequence (CVS), wherein the CVS is provided by a source device 110. The error in this context primarily refers to that at least one sample, e.g. representing a pixel, in the decoded picture, i.e. decoded by the target device 120, is different from a reconstructed picture, corresponding thereto, in the source device 110. The source device 110 performs a method for handling an error message relating to an error in a decoded picture of the CVS, encoded by the source device 110 and sent from the source device 110 to the target device 120. The analyser 130 performs a method for managing a feedback message for indication of an error in a picture of the CVS, wherein the source device 110 is configured to encode and send the CVS, included in a transmission, to the target device 120 in a session. The CVS may be a HEVC compliant CVS. The CVS may be provided, e.g. sent by the source device 110, using Real-time Transport Protocol "RTP".

The following actions may be performed in any suitable order.

Action 200a Through 200d

These actions include set up and control signalling, such as one or more of actions 200a-200d in FIG. 2b below. Set up and control signalling may be performed at any time if necessary, i.e. even though here illustrated as initial actions, these actions may in some embodiments be performed after any one of the following actions as deemed suitable, e.g. after action 206 and/or after action 208. For example, one or more of actions 200a-200d may be performed as a result of change of connection between the encoder and the decoder, e.g. the connection may change from wired to wireless, or from cellular to WiFi due to different data rates, cost of data etc.

Action 201

Prior to this action, the source device 110 may have encoded pictures into a CVS. Then, the source device 110 may send the CVS to the target device 120, e.g. to be displayed at a display associated with the target device 120.

Action 202

Subsequent to action 201, the target device 120 receives a picture of the CVS, or at least one picture of the CVS, from the source device 110.

Action 203

In order to make it possible for the target device 120 to check for an error in the picture, the source device 110 may send a DPH SEI message to the target device 120.

Action 204

When action 203 has been performed, the target device 120 receives a first Decoded Picture Hash (DPH) for the picture from the DPH SEI message of the CVS. To be explicit, the DPH SEI message is received from the source device 110. The first DPH is thus a DPH value calculated based on image data, e.g. pixel values, of the picture.

Action 205

The target device 120 calculates a second DPH for the picture. The second DPH is also a DPH value calculated based on image data, e.g. pixel values, of the received and decoded picture. The received and decoded picture may unintentionally due to errors be different from the picture sent in action 201.

Action 206

Thus, the target device 120 detects the error by finding that the first DPH is different from the second DPH. A so called mismatch between the first and second DPHs is accordingly identified.

The target device 120 is thus able to detect errors it otherwise wouldn't detect and repair them quickly, prior to potentially widespread corruption of the video picture occurs. This enables an improved video quality in both streaming media and communication.

Action 207 or action 208 may be performed.

Action 207

The target device 120 sends a feedback message to the source device 110 in response to the detection of the error. The feedback message indicates that the error has been detected. In more detail, the feedback message is sent, by the target device 120 to the source device 110, as a reaction to that the error has been detected. Thus, the target device 120 attempts to take action(s) to avoid that a further error, or the same error, happens again.

In this action, the target device 120 and the source device 110 may be comprised in a real-time system 100. The CVS may be provided, e.g. sent by the source device 110, using Real-time Transport Protocol "RTP".

Existing feedback mechanism may be used, but the sending of the feedback is triggered by match or mismatch in decoded picture hash between hash values encoded in the bitstream and hash values calculated by the target device 120.

As an example, the target device 120 may send a FIR when it detects a mismatch between DPH SEI messages, exemplified by the first DPH, and the hash values calculated by the target device 120, exemplified by the second DPH.

In a further example, the target device 120 may send a PLI, or a SLI, when it detects a mismatch between DPH SEI messages and the hash values calculated by the target device 120. Thus, the feedback message may comprise an indication indicative of error. As an example, the indication indicative of error may be that the indication is indicative of that the target device 120 has detected the error, or that the target device 120 has detected that the CVS is error-free.

In another example, the target device 120 may send positive feedback information using RPSI when it detects a match between decoded picture hash SEI messages and the hash values calculated by the decoder. The RPSI will identify the current pictures and possibly other previously decoded pictures as "correctly decoded".

The target device 120 may send a positive feedback information using RPSI when it detects a mismatch between decoded picture hash SEI messages and the hash values calculated by the decoder. The RPSI will identify one or more previously decoded pictures as "correctly decoded" when the current picture is corrupt.

The target device may send a feedback message to change the configuration of the source device using a signalling protocol, such as SIP re-invite with an SDP that includes the new configuration. This is herein referred to as an instruction message including a configuration for encoding.

In other embodiments, the feedback message may be defined as a new type of feedback message. Thus, the feedback message may comprise the indication indicative of error, i.e. a picture may not have been correctly decoded. Herein this new type of feedback message may be referred to as a Picture Hash Mismatch Indication (PHMI) message. The PHMI message is sent by the target device 120 when it detects a mismatch between DPH SEI messages and the hash values calculated by the target device.

With these embodiments, the source device 110 may react to the PHMI message in the same way it would react to a FIR message, i.e. by sending an intra-picture that resets the target device 120.

Furthermore, the source device 110 may react to a PHMI message in the same way it would react to a PLI or SLI message, e.g. by sending an intra-picture that resets the target device 120 or by refreshing the target device, i.e. refreshing a decoder state progressively through intra blocks or intra slices when the decoder is included in the target device 120.

The source device 110 may react to the PHMI message by changing the encoder configuration in order to try to find a configuration for which there are no compatibility problems. See also action 210.

Action 208

In this action, the source device 110 receives, from the target device 120, the error message mentioned in the introductory text relating to FIG. 2.

In order to distinguish a first case, the error message comprises the feedback message sent in action 207.

Alternatively, in order to distinguish a second case, the error message comprises a mismatch message indicating a category of the error. The second case relates to when action

217 has been performed. The second case will be returned to after the description of action 217 below.

Figure 2B:
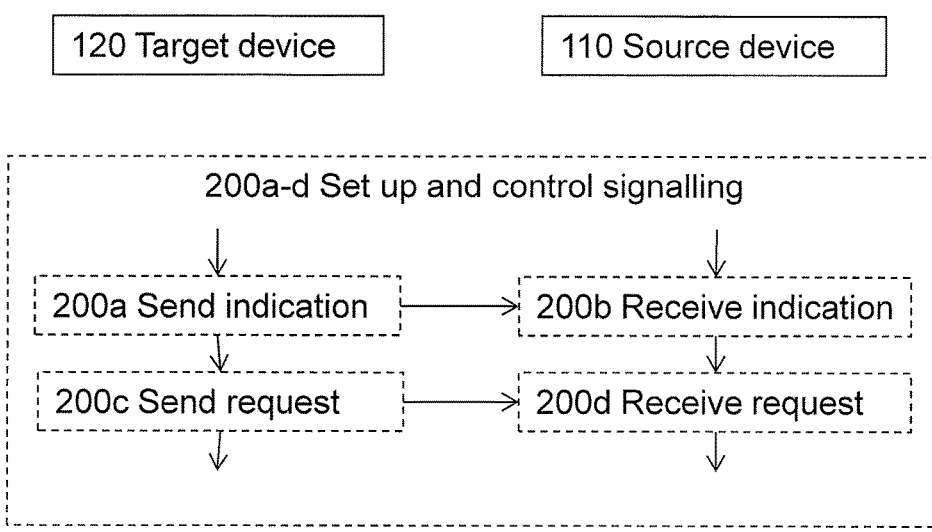
FIG. 2b is a detailed view of a portion of the combined signalling scheme and flowchart of FIG. 2a, FIGS. 2c and 2d are flowcharts illustrating embodiments herein.
Figure 2C:
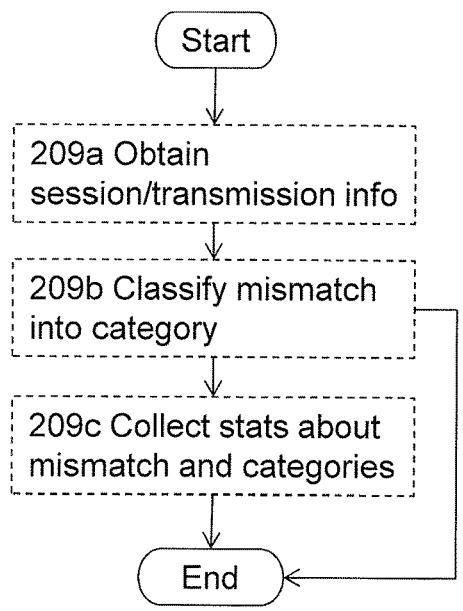

Actions 209*a* through 209*c* are shown in FIG. 2*c*.

Action 210

Continuing with the first case, the source device 110 changes configuration for encoding of pictures based on the feedback message.

Examples of such changes of configuration include, but are not limited to one or more of the following, presented in two columns:

| | |
|---|---|
| change of resolution | disable long term pictures |
| change of frame rate | disable strong intra smoothing |
| change of level | disable dependent slice segments |
| change of bitrate | disable transform skip |
| change of profile | disable weighted prediction |
| change of tools used, e.g.: | disable transquant bypass |
|    disable SAO | disable deblocking |
|    disable sign data hiding | change parallelism configuration |
|    disable PCM |    change the tile configuration |
|    disable AMP |    turn on or off wavefront parallel processing |
|    disable scaling lists |    use more or fewer slices |

The source device 110 may also change the configuration of how the NAL units are packetized in RTP packets, such as disabling the use of aggregation packets or fragmentation units.

The PHMI message may be replaced by a more general Picture Corrupt Indication (PCI) message that can be triggered not only by detection of mismatch in the decoded picture hash, such as by comparing the first and second DPHs, but also by other events such as the decoding process discovering disallowed data or ending up in an erroneous state, e.g. due to bit errors in the bitstream, e.g. the CVS. A PCI message can be realized within an RPSI message in which case it would indicate which picture(s) should not be used as reference picture(s), instead of which picture(s) should be used as reference picture(s).

The PHMI message may be transported using HTTP, and formulated as an application specific message, e.g. using a JSON object that is being sent to the server to indicate the mismatch.

Action 211

Continuing with the second case, the target device 120 fetches pictures of a further CVS from the source device 110 in response to the detection of the error, wherein the further CVS is a second representation being different from a first representation of the CVS related to the received picture. The CVS and the further CVS relate to the same video sequence, the same part of the video sequence or different parts thereof.

The target device 120 may comprise, e.g. execute, an adaptive streaming service client, using e.g. DASH protocol, HTTP Live Streaming (HLS), Real-Time Streaming Protocol (RTSP) or the like.

In more detail, the target device 120 may be a streaming media target, which upon detecting a hash mismatch, may request from the source device 110 the same representation, a full chunk or a particular byte-range for the content from the latest entry point until the hash-mismatch occurred. This enables the target device 120 to determine if it was the content transport that introduced the error. By using HTTP etag header and conditional GET request (where "GET" is a method request in HTTP) and/or cache directives, the target device 120 can attempt to force any content cache to verify the integrity of its content, or bypass the cache. If the hash mismatch remains after this first step, it can be most likely to be attributed to encoder-decoder incompatibilities. Then, the target device 120 attempts to resolve it by requesting another encoded representation of the content, e.g. another CVS.

Action 212

The source device 110 may according to known manners provide the CVS fetched by the target device 120.

Figure 2D:
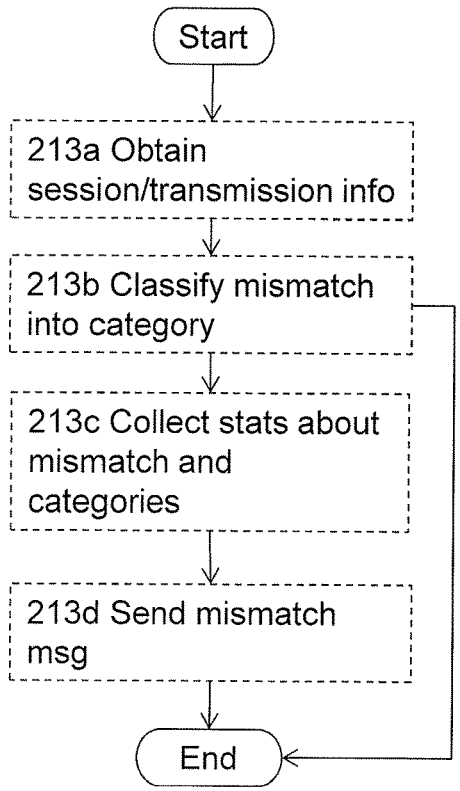

Actions 213*a* through 213*d* are shown in FIG. 2*d*.

Action 214

Now returning to the second case, mentioned in connection with action 208, the analyser 130 receives the feedback message and any existing further feedback messages, indicating that the error has been detected by the target device 120. The feedback message(s) is (are) received from the target device 120.

Action 215

The analyser 130 obtains information about the session and the transmission, e.g. related to the CVS. Session information may be obtained from the signalling exchange between the target device 120 and the source device 110 to establish the session.

Information about the transmission of the CVS when RTP is used may be periodically received from the target device 120 using RTCP Report Blocks and/or RTCP Extended Reports reporting on the RTP packet reception of the RTP packets from the source device 110 that carries the CVS or part of it. The RTCP report block provides information such as counters for the cumulative number of packets lost, fraction lost, extended highest sequence number received. RTCP Extended Reports may report exactly which RTP packets that was lost.

The transport protocol state or information from the transport protocol about the state, loss events etc. may be provided to the analyser 130. In cases when the analyser 130 is part of the target or source device, the analyser may use any local information about the transmission.

Furthermore, the analyser 130 may obtain information of in which packets or part of the transmission a particular picture of the CVS was present. This can either be obtained from the source device 110 or be determined in the target device 120 based on the parts of the CVS that is received. As mentioned above, the transmission includes the CVS. This may be expressed as that information about the session and the transmission of the CVS is obtained.

Action 216

The analyser 130 classifies a mismatch, identified by the feedback message, into a category based on the information about the session and the transmission as well as the feedback message. The category may indicate that the source device 110 and the target device 120 are incompatible. This may apply at least with respect to the (this) CVS.

The analyser 130 may firstly determine a risk for bit-errors in the transmission between the source device 110 and the target device 120. Using the session information about used transmission method and its capability for preventing bit-errors from being delivered to the decoder, e.g. the use of Secure RTP, see RFC 3711, with a sufficiently long integrity tag makes the probability of undetected bit-errors so low that it can be dismissed as plausible reason. In another example, the usage of no integrity protection or just packet level internet checksums have significant enough risk for bit-errors that this is a possible cause for any mismatch.

To classify a mismatch as being caused by a transmission error, the analyser 130 combine the information about when the transmission of the particular picture occurred with any transmission error or packet loss events. If there occurred one or more such error or loss events during the pictures transmission, e.g. the target device receives three (sequence numbers: 5124, 5125, and 5127) out of the four RTP packets (Sequence numbers: 5124-5127) for a particular picture in the CVS but is missing packet with sequence number 5126, the mismatch can be categorized as based on transmission error, assuming no mechanism, such as retransmission or forward error correction was able to recover or replace the missing packets.

When other potential reasons for mismatch are possible, they should be part of the classification. If they can be determined as the reason for the error, then the classification should be set to that reason. If they are ruled out, processing continues to the next possible reason.

When all other known potential reasons have been determined to be of insignificant probability then the mismatch can be classified as codec incompatibility. In some cases when not all other known possible reasons can be ruled as cause for mismatch. Some characterization of likelihood of codec incompatibility may be determined by the analyser 130. The characterization may for example be expressed as a probability for each of the potential categorizes that can't be rule out that the error was of that particular category. These probabilities may be determined by weighting together factors that may cause them and the likelihood that the different occurs given the situation.

Action 217

The analyser 130 sends a mismatch message indicating the category to the source device 110.

However, in some case such as in a DASH scenario, the mismatch message may be sent to the target device 120.

Action 218

The analyser 130 may classify a further mismatch, identified by an additional feedback message received by the analyser 130, into a further category based on the additional feedback message, the feedback message and related information about the session and the transmission. The further category may be equal to or different from the category mentioned above.

Action 219

The analyser 130 may collect statistics about the mismatch and the category, and/or the further mismatch and the further category.

In some examples, the PHMI message is sent by the target device 120 when it detects a mismatch between decoded picture hash SEI messages and the hash values calculated by the decoder.

In this embodiment, statistics regarding the hash mismatches and/or the PHMI feedback messages are collected. The statistics collected for the mismatches/PHMI may include number of hash mismatches, when the mismatch occurred, the frequency and burstiness of these occurrences.

The PHMI feedback may be collected in combination with other feedback or reception reports, such as SLI, PLI, FIR etc. The collecting entity compares packet loss, and other loss statistics, such as failed transport checksums, as well as the applied protection against bit-errors to derive the likelihood that the hash mismatches are a result of transport induced bit-errors versus incompatibilities between encoder and decoder. In cases where strong integrity protection has been applied, such as cryptographic hashes with sufficient numbers of bits to make it very unlikely that bit-errors are not detected and passed on to the decoder, then any hash mismatch can be considered an incompatibility indication. In cases where there is significant probability that a hash mismatch was caused by a bit-error introduced by the transport, then further processing is required to determine the cause. This may include comparing the packet loss rate or rate of checksum failures detected in the receiver at the time of the hash mismatch, assuming packet loss repair mechanisms are used to prevent the hash mismatch from originating from loss of encoded video data for the video picture where the mismatch occurred. Increased such rates are indication that this mismatch may originate from undesired bit-stream modification, rather than incompatibilities.

The analyser may also gather information about where the endpoints are topologically connected to the networks, possibly also where they are geographically located. If detailed information about the network path can be determine it can also be stored for future processing. By combining statistics from multiple communication session providing PHMI feedback the collector can determine if usage of certain networks, geographical location or network paths provides a higher hash mismatch rate than other paths or locations.

The analyser may also gather information about the hardware and software implementation of the endpoints and especially the video encoder and decoders used in the session. By calculating probabilities for hash mismatches between different sets of encoder and decoder implementation combinations, taking known transport impairments into account, encoder-decoder combinations with potential incompatibilities can be identified.

In some embodiments, the feedback messages, e.g. being indicative of hash mismatch events, are collected using RTCP, where the collecting node gets the RTCP PHMI feedback message sent as well as regular RTCP reports providing packet loss indications and any RTCP extended reports providing loss indications or transport checksum failures. These RTCP reports can be gathered in any device that the message passes and which is able to access the RTCP message, e.g. media conference servers, IMS Media Resource Function Processor (MRFP), Session Border Gateway (SBG).

The hash mismatch event may be sent to a server using HTTP, in the form of an application specific message, e.g. formatted as a JavaScript Object Notation (JSON) object.

FIG. 2b shows a schematic combined signalling and flowchart, illustrating set up and control signalling in the system 100 of FIG. 1.

The following actions may be performed in any suitable order.

Action 200a

The target device 120 may send, to the source device 110, an indication indicative of capability to send the feedback message. The indication indicative of capability may be sent using SDP.

Action 200b

The source device 110 may receive the indication indicative of capability when action 200a has been performed. Thus, the source device 110 may refrain from performing action 203, e.g. send inband DPH SEI messages in case the indication indicative of capability informs the source device 110 about that the target device is not capable of sending the feedback message. Thus, valuable bandwidth may be saved, while no inband DPH SEI message are wasted towards a target device 120 which is not capable of sending the feedback message.

Action 200c

The target device 120 may send, to the source device 110, a request for inclusion, by the source device 110, of at least one DPH SEI message in the CVS. The request may be sent using SDP Action 200d The source device 110 may receive the request when action 200c has been performed. Also in this case, bandwidth in the direction from the source device 110 to the target device 120 may be saved, since the target device 120 may preferably only request the source device 110 to send DPH SEI messages when the target device is capable of sending the feedback message in response to action 206, such as a detection of error.

FIG. 2c shows a schematic flowchart illustrating exemplifying actions in the source device 110. These actions are similar to actions 215-219 performed by the analyser 130.

The following action may be performed in any suitable order.

Action 209a

The source device 110 may obtain information about the session and the transmission;

Action 209b

The source device 110 may classify a mismatch, identified by the feedback message, into a category based on the information about the session and the transmission as well as the feedback message.

These actions are similar to actions in 219 but performed by the source device 110.

Action 209c

The source device 110 may collect statistics about the mismatch and the category, and/or the further mismatch and the further category.

FIG. 2d shows a schematic flowchart illustrating exemplifying actions in the target device 120. These actions are similar to actions 215-219 performed by the analyser 130.

The following action may be performed in any suitable order.

Action 213a

The target device 120 may obtain information about the session and the transmission.

Action 213b

The target device 120 may classify a mismatch, identified by the feedback message, into a category based on the information about the session and the transmission as well as the feedback message. These actions are similar to actions in 219 but performed by the target device 120.

In this embodiment, the same kind of statistics and analysis as mentioned above in relation to e.g. action 219 is obtained, but this time in the target device 120. Thus, there is no need for introducing any new feedback message, referred to as PHMI message herein. Instead hash mismatch information is stored locally in the target device for later retrieval. Statistics analysis may also be performed locally to classify the hash mismatch as one most likely to be caused by bit-error or packet loss introduced in transport or as one caused by encoder-decoder incompatibilities. To perform this analysis the transport protocols statistics for checksum failures may be periodically sampled to determine frequency of such events and enable correlation with hash mismatch events.

The resulting statistics can be high level summarized information as number of hash mismatches attributed to transport impairments, and encoder-decoder incompatibilities, respectively for a particular communication session. The receiver side can also provide the more detailed underlying values to enable further processing in a statistics gatherer.

The statistics may be gathered using program or a program module accessing an Application Programmable Interface (API) on the end-point participating in a communication session. The API provides access to locally gathered information and processed statistics, e.g. WebRTC RTCPeerConnection Statistics API.

As an example, statistics may be gathered from an endpoint by accessing a Management Information Base (MIB) using e.g. Simple Network Management Protocol (SNMP).

Moreover, the statistics may be gathered from an endpoint by having the application, e.g. a JavaScript application submit a statistics report to the server for the communication session. The information in statistics is gathered in some type of data object, e.g. a JSON object.

Action 213c

The target device 120 may collect statistics about the mismatch and the category, and/or the further mismatch and the further category.

Action 213d

The target device 120 may send, to the source device 110, a mismatch message indicating the category.

An advantage of, at least some embodiments herein, is that they enable the detection and quick repair of any errors. Moreover, they also enable the target device 110 and/or the source device 120 to take active measurements to avoid introducing future errors. In this manner, the probability of video quality reducing events is reduced.

For some embodiments e.g. including some or all of actions 214-219, an advantage is that a service provider, examples are given below, may detect and measure the frequency of video picture decoding errors in its service. These errors include errors that it previously was unable to detect and measure the duration (number of frames) for which any error remains present in the decoded pictures. The capability to detect the errors and statistically process the frequency and severity of them enables the service provider to target its quality improvements on the most severe cases, which gives the greatest improvements in video quality across the users of the system.

The service provider may e.g. be a web-site provider which provides a website from which media files may be streamed to a user. In a real-time scenario, the service provider may provide a communication service that enables its users to communicate with each other.

Some or all of actions 213a-d provide the same benefits as directly above, but with the further advantage that less data needs to be gathered and processed by the analyser, instead the target device 120 performs more of this collection and processing.

Thanks to some or all of actions 214-219, the system is able to to determine where any issues do arise during actual usage of the system. Thus, less testing and verification when the system is not in use may be required.

In further various embodiments, the following applies.

To correct the image with the knowledge of which picture or pictures that have been received and failed to decode correct the encoder can take this information into account and select the most appropriate action out of a set of actions:

Encode the next video picture using a reference picture still available in the decoder that hasn't been reported as failing validation.

Create an IDR picture, to avoid any risk of previous errors remaining as erroneous state in decoder.

On a longer time scale the encoder can use reported hash errors over possibly multiple different video pictures, and correction attempts as indication that some encoding tools appears to not result in intended output, i.e. some issues with standards compliance exists, either in encoder or decoder. To minimize the impact for the rest of the video session, the encoder can select another set of encoding tools, less likely to generate compatibility issues in the implementation and observe if that resolves the issues. The video errors could be the result of bit-errors, unless strong integrity verification is used. These bit-errors are introduced in the encoded data between the encoder and decoder, the heuristics for this may take the probabilities of such errors into account before enabling this mode of encoder operation.

On a larger time scale and not only in an individual communication session, the hash errors can be gathered using a multitude of gathering mechanisms and statistically analyzed across a whole communication system to determine conditions when hash errors occur. Using additional information about the session and other gathered statistics the system can attempt to identify some different cases, including:

Encoder/decoder implementation combinations that appear to have incompatibilities. Reporting the error to the implementers of the affected encoders and decoders to address the issue.

Find end-points, network attachment locations or other equipment or location dependent indicators for statistically significant variations in the hash error rate, to enable further fault location, such as network paths or equipment causing higher error rates.

If the cost of including hashes in all pictures are considered too high, the encoder can select to only include hashes in a subset of the video pictures, for example only pictures used as reference pictures.

The video system detection of errors or encoder to decoder incompatibilities is not restrained to real-time interactive services that predominantly use RTP. This can also be applied to content services like adaptive streaming, e.g. using DASH. These methods use chunks or a continuous byte-stream that are fetched using HTTP. The video stream is normally not live-encoded, thus direct adaptation to avoid compatibilities or correct errors are limited. The adaptation mechanism in streaming client could be complemented with looking at reconstructed image hash validation data and use failures or validations as part of the data to make the decision to select other representations of the video, more suited to the client. The system level analysis can equally be performed by having the client report to the server what failures in validation that do occur.

Figure 3:
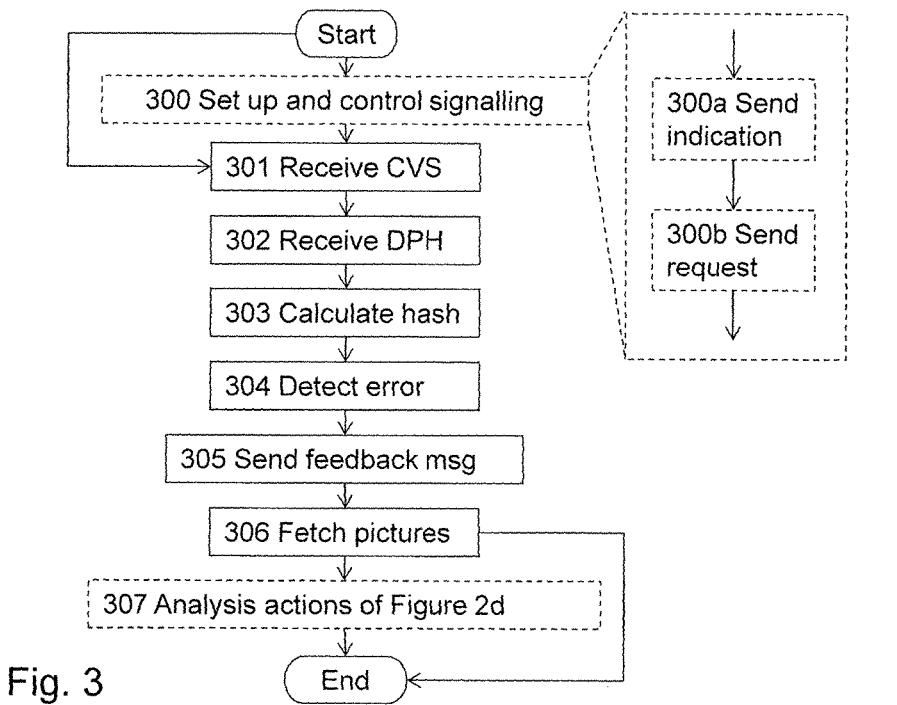
FIG. 3 is a flowchart illustrating embodiments of the method in the target device.

In FIG. 3, an exemplifying, schematic flowchart of embodiments of the method in the target device 120 is shown. As mentioned, the target device 120 performs a method for managing an error detected in a decoded picture of a coded video sequence (CVS), wherein the CVS is provided by a source device 110. The CVS may be provided, e.g. sent by the source device 110, using Real-time Transport Protocol "RTP".

As mentioned, the CVS may be a High Efficiency Video Coding "HEVC" compliant CVS.

The following actions may be performed in any suitable order.

Action 300

This action includes set up and control signalling, such as one or more of actions 300a-300b below. Set up and control signalling may be performed at any time if necessary, i.e. even though here illustrated as initial actions, these actions may in some embodiments be performed after any one of the following actions, as deemed suitable, e.g. after action 304.

Action 300a

The target device 120 may send, to the source device 110, an indication indicative of capability to send the feedback message. The indication indicative of capability may be sent using SDP. This action is similar to action 200a.

Action 300b

The target device 120 may send, to the source device 110, a request for inclusion, by the source device 110, of at least one DPH SEI message in the CVS. The request may be sent using SDP. This action is similar to action 200c.

Action 301

The target device 120 receives a picture of the CVS from the source device 110. This action is similar to action 202.

Action 302

The target device 120 receives a first DPH for the picture from a DPH SEI message of the CVS. This action is similar to action 204.

Action 303

The target device 120 calculates a second DPH for the picture. This action is similar to action 205.

Action 304

The target device 120 detects the error by finding that the first DPH is different from the second DPH. This action is similar to action 206.

Action 305

The target device 120 sends a feedback message to the source device 110 in response to the detection of the error, wherein the feedback message indicates that the error has been detected. This action is similar to action 207.

For the alternative of sending the feedback message, the target device 120 and the source device 110 may be comprised in a real-time system 100. The CVS may be provided using Real-time Transport Protocol "RTP". The feedback message may be sent using RTP/Real-Time Control Protocol "RTCP".

The feedback message may comprise one or more of an indication indicative of error, an instruction message including a configuration for encoding, a Slice Loss Indication "SLI", a Picture Loss Indication "PLI", an Full Intra Request "FIR", a Reference Picture Selection Indication "RPSI".

When the feedback message comprises one or more of an indication indicative of error, a Slice Loss Indication "SLI", a Picture Loss Indication "PLP", an Full Intra Request "FIR", a Reference Picture Selection Indication "RPSI", the feedback message may be sent using Real-Time Control Protocol "RTCP".

When the feedback message comprises the instruction message including the configuration for encoding, the feedback message may be sent using SDP.

Action 306

The target device 120 fetches 211 pictures of a further CVS from the source device 110 in response to the detection of the error, wherein the further CVS is a second representation being different from a first representation of the CVS related to the received picture. This action is similar to action 211.

For the alternative of fetching the pictures of the CVS, the target device 120 may comprise an adaptive streaming service client.

Action 307

This action may be seen as one action or as three separate actions.

The target device 120 may obtain information about the session and the transmission. This action is similar to action 213a.

The target device 120 may classify a mismatch, identified by the feedback message, into a category based on the information about the session and the transmission as well as the feedback message. This action is similar to action 213b.

The target device 120 may send a mismatch message indicating the category. This action is similar to action 213c.

Figure 4:
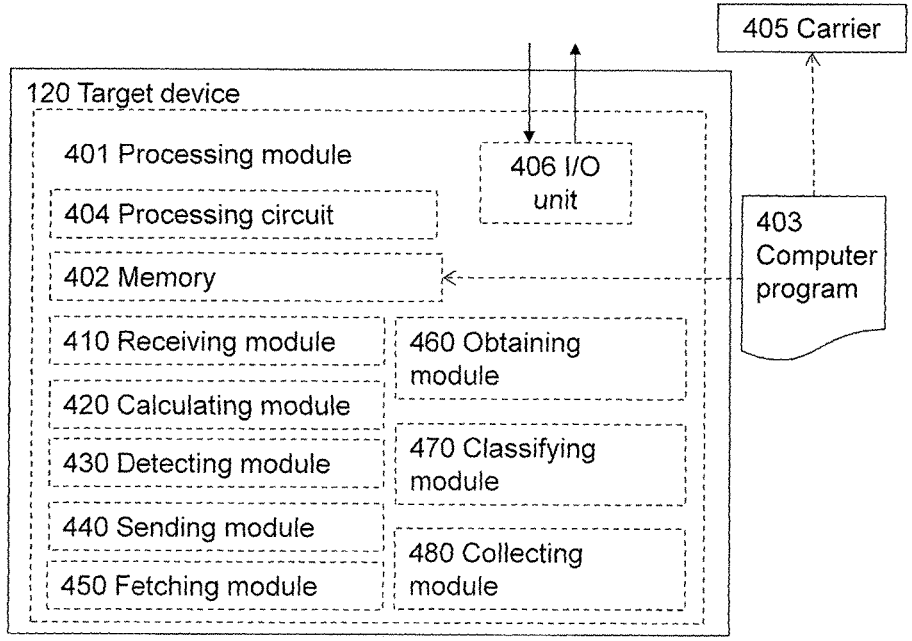
FIG. 4 is a block diagram illustrating embodiments of the target device.

With reference to FIG. 4, a schematic block diagram of the target device 120 is shown. The target device 120 is configured to manage an error detected in a decoded picture of a CVS, wherein the CVS is provided by the source device 110.

As mentioned, the CVS may be provided using RTP. The CVS may be a HEVC compliant CVS.

The target device 120 may comprise a processing module 401, such as a means, one or more hardware modules and/or one or more software modules for performing the methods described herein.

The target device 120 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the target device 120 is operative to perform the methods of one or more of FIGS. 2a-2d and/or FIG. 3.

In some other embodiments, the computer readable code units may cause the target device 120 to perform the method according to one or more of FIGS. 2a-2d and/or 3 when the computer readable code units are executed by the target device 120.

FIG. 4 further illustrates a carrier 405, comprising the computer program 403 as described directly above. The carrier 405 may be one of an electronic signal, an optical signal, a radio signal, and a computer readable medium.

In some embodiments, the processing module 401 comprises an Input/Output (I/O) unit 406, which may be exemplified by a receiving module and/or a sending module as described below when applicable.

In further embodiments, the target device 120 and/or the processing module 401 may comprise one or more of a receiving module 410, a calculating module 420, a detecting module 430, a sending module 440, a fetching module 450, an obtaining module 460 and a classifying module 470, a collecting module 480 as exemplifying hardware modules. In other examples, the aforementioned exemplifying hardware modules may be implemented as one or more software modules.

Therefore, according to the various embodiments described above, the target device 120 is operative to and/or the target device 120, the processing module 401 and/or the receiving module 410 is configured to receive a picture of the CVS from the source device 110.

The target device 120 is operative to and/or the target device 120, the processing module 401 and/or the receiving module 410, or a further receiving module (not shown), is configured to receive a first Decoded Picture Hash "DPH" for the picture from a DPH Supplemental Enhancement Information "SEI" message of the CVS.

The target device 120 is operative to and/or the target device 120, the processing module 401 and/or the calculating module 420 is configured to calculate a second DPH for the picture.

The target device 120 is operative to and/or the target device 120, the processing module 401 and/or the detecting module 430 is configured to detect the error by finding that the first DPH is different from the second DPH.

The target device 120 is operative to and/or the target device 120, the processing module 401 and/or the sending module 440 is configured to send a feedback message to the source device 110 in response to the detection of the error, wherein the feedback message indicates that the error has been detected.

Alternatively, the target device 120 is operative to and/or the target device 120, the processing module 401 and/or the fetching module 450 is configured to fetch pictures of a further CVS from the source device 110 in response to the detection of the error, wherein the further CVS is a second representation being different from a first representation of the CVS related to the received picture.

For the alternative when the target device 120 is configured to send the feedback message, the target device 120 and the source device 110 are comprised in a real-time system 100.

The feedback message may comprise one or more of an indication indicative of error, an instruction message including a configuration for encoding, a Slice Loss Indication "SLI", a Picture Loss Indication "PLI", an Full Intra Request "FIR", a Reference Picture Selection Indication "RPSI".

When the feedback message comprises one or more of an indication indicative of error, a Slice Loss Indication "SLI", a Picture Loss Indication "PLI", an Full Intra Request "FIR", a Reference Picture Selection Indication "RPSI", the feedback message may be sent using Real-Time Control Protocol "RTCP".

When the feedback message comprises the instruction message including the configuration for encoding, the feedback message may be sent using SDP. This may mean that the target device 120 may be operative to and/or the target device 120, the processing module 401 and/or the sending module 440 may be configured to send the feedback message using SDP.

For the alternative of when the target device 120 is configured to fetch the pictures of the CVS, the target device 120 comprises an adaptive streaming service client.

Moreover, the target device 120 may be operative to and/or the target device 120, the processing module 401 and/or the sending module 440, or another sending module (not shown) may be configured to send a mismatch message indicating the category.

The target device 120 may be operative to and/or the target device 120, the processing module 401 and/or the obtaining module 460 may be configured to obtain information about the session and the transmission.

The target device 120 may be operative to and/or the target device 120, the processing module 401 and/or the classifying module 470 may be configured to classify a mismatch, identified by the feedback message, into a category based on the information about the session and the transmission as well as the feedback message.

The target device 120 may be operative to and/or the target device 120, the processing module 401 and/or the sending module 440, or a still further sending module (not shown), may be configured to send, to the source device 110, an indication indicative of capability to send the feedback message. The indication indicative of capability may be sent using SDP, i.e. the target device 120 may be configured to send the indication using SDP.

The target device 120 may be operative to and/or the target device 120, the processing module 401 and/or the sending module 440, or a yet further sending module (not shown), may be configured to send, to the source device 110, a request for inclusion, by the source device 110, of at least one DPH SEI message in the CVS. The request may be sent using SDP, i.e. the target device 120 may be configured to send the request using SDP.

The target device 120 may be operative to and/or the target device 120, the processing module 401 and/or the collecting module 480 may be configured to collect statistics about the mismatch and the category.

Figure 5:
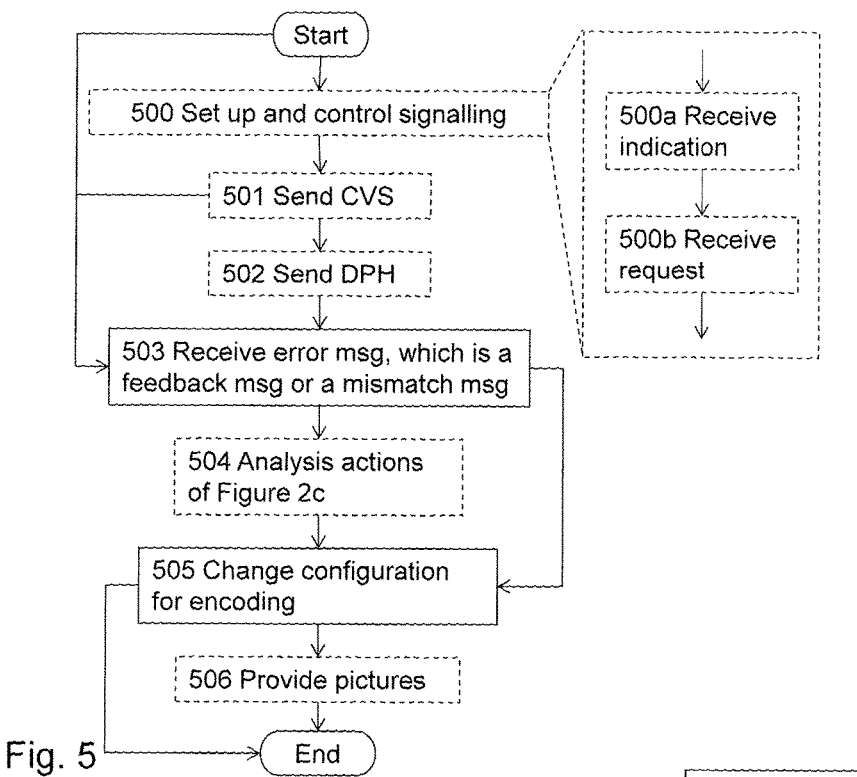
FIG. 5 is a flowchart illustrating embodiments of the method in the source device.

In FIG. 5, an exemplifying, schematic flowchart of embodiments of the method in the source device 110 is shown. As mentioned, the source device 110 performs method for handling an error message relating to an error in a decoded picture of the CVS, encoded by the source device 110 and sent from the source device 110 to the target device 120.

As mentioned, the CVS may be a HEVC compliant CVS.

The following actions may be performed in any suitable order.

Action 500

This action includes set up and control signalling, such as one or more of actions 500a-500b below. Set up and control signalling may be performed at any time if necessary, i.e. even though here illustrated as initial actions, these actions may in some embodiments be performed after any one of the following actions, as deemed suitable, e.g. after action 503.

Action 500a

The source device 110 may receive, from the target device 120, an indication indicative of capability to send the feedback message. The indication indicative of capability may be received using SDP. This action is similar to action 200b.

Action 500b

The source device 110 may receive, from the target device 120, a request for inclusion, by the source device 110, of at least one DPH SEI message in the CVS. The request may be received using SDP. This action is similar to action 200d.

Action 501

Prior to this action, the source device 110 may have encoded pictures into a CVS. Then, the source device 110 may send the CVS to the target device 120, e.g. to be displayed at a display associated with the target device 120. This action is similar to action 201.

Action 502

In order to make it possible for the target device 120 to check for an error in the picture, the source device 110 may send a DPH SEI message to the target device 120. This action is similar to action 203.

Action 503

The source device 110 receives, from the target device 120, the error message, wherein the error message comprises:

a feedback message indicating that the error has been detected by the target device 120, or a mismatch message indicating a category of the error.

The feedback message may comprise one or more of an indication indicative of error, an instruction message including a configuration for encoding, a Slice Loss Indication "SLI", a Picture Loss Indication "PLI", an Full Intra Request "FIR", a Reference Picture Selection Indication "RPSI".

When the feedback message comprises one or more of an indication indicative of error, a Slice Loss Indication "SLI", a Picture Loss Indication "PLI", an Full Intra Request "FIR", a Reference Picture Selection Indication "RPSI", the feedback message may be sent using Real-Time Control Protocol "RTCP".

When the feedback message comprises the instruction message including the configuration for encoding, the feedback message may be sent using SDP.

This action is similar to action 208.

Action 504

This action may be seen as one action or three separate actions.

The source device 110 may obtain information about the session and the transmission. This action is similar to action 209a.

The source device 110 may classify a mismatch, identified by the feedback message, into a category based on the information about the session and the transmission as well as the feedback message. This action is similar to action 209b.

Action 505

The source device 110 changes 210 configuration for encoding of pictures based on the error message, such as the feedback message, the mismatch message or the like. This action is similar to action 210.

Action 506

The source device 110 may according to known manners provide the CVS fetched by the target device 120. This action is similar to action 212.

Figure 6:
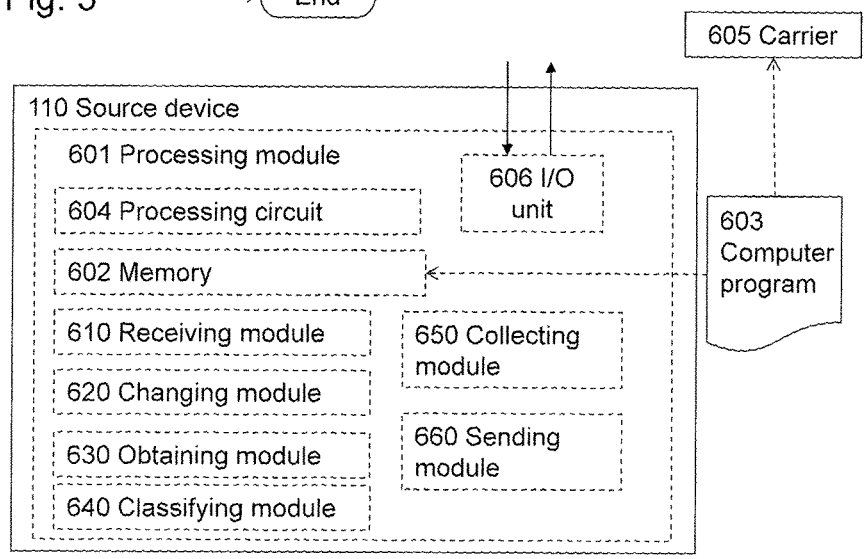
FIG. 6 is a block diagram illustrating embodiments of the source device.

With reference to FIG. 6, a schematic block diagram of the source device 110 is shown. The source device 110 is configured to handle an error message relating to an error in a decoded picture of a CVS, encoded by the source device 110 and sent from the source device 110 to a target device 120.

As mentioned, the CVS may be an HEVC compliant CVS.

The source device 110 may comprise a processing module 601, such as a means, one or more hardware modules and/or one or more software modules for performing the methods described herein.

The source device 110 may further comprise a memory 602. The memory may comprise, such as contain or store, a computer program 603.

According to some embodiments herein, the processing module 601 comprises, e.g. 'is embodied in the form of' or 'realized by', a processing circuit 604 as an exemplifying hardware module. In these embodiments, the memory 602 may comprise the computer program 603, comprising computer readable code units executable by the processing circuit 604, whereby the source device 110 is operative to perform the methods of one or more of FIGS. 2a-2d and/or FIG. 5.

In some other embodiments, the computer readable code units may cause the source device 110 to perform the method according to one or more of FIGS. 2a-2d and/or 5 when the computer readable code units are executed by the source device 110.

FIG. 6 further illustrates a carrier 605, comprising the computer program 603 as described directly above. The carrier 605 may be one of an electronic signal, an optical signal, a radio signal, and a computer readable medium.

In some embodiments, the processing module 601 comprises an Input/Output (I/O) unit 606, which may be exemplified by a receiving module and/or a sending module as described below when applicable.

In further embodiments, the source device 110 and/or the processing module 601 may comprise one or more of a receiving module 610, a changing module 620, an obtaining module 630, a classifying module 640, a collecting module 650 and a sending module 660 as exemplifying hardware modules. In other examples, the aforementioned exemplifying hardware module may be implemented as one or more software modules.

Therefore, according to the various embodiments described above, the source device 110 is operative to and/or the source device 110, the processing module 601 and/or the receiving module 610 is configured to receive, from the target device 120, the error message, wherein the error message comprises a feedback message indicating that the error has been detected by the target device 120, or a mismatch message indicating a category of the error.

The feedback message may comprise one or more of an indication indicative of error, an instruction message including a configuration for encoding, a Slice Loss Indication "SLI", a Picture Loss Indication "PLI", an Full Intra Request "FIR", a Reference Picture Selection Indication "RPSI".

When the feedback message comprises one or more of an indication indicative of error, a Slice Loss Indication "SLI", a Picture Loss Indication "PLI", an Full Intra Request "FIR", a Reference Picture Selection Indication "RPSI", the feedback message may be sent using Real-Time Control Protocol "RTCP".

When the feedback message comprises the instruction message including the configuration for encoding, the feedback message may be sent using SDP. This may mean that the source device 110 may be operative to and/or the source device 110, the processing module 601 and/or the sending module 660 may be configured to send the instruction message using SDP.

The source device 110 is operative to and/or the source device 110, the processing module 601 and/or the changing module 620 is further configured to change configuration for encoding of pictures based on the error message.

The source device 110 may be operative to and/or the source device 110, the processing module 601 and/or the receiving module 610, or another receiving module (not shown) may be further configured to receive the feedback message and any existing further feedback messages, which indicates that the error has been detected by the target device 120.

The source device 110 may be operative to and/or the source device 110, the processing module 601 and/or the obtaining module 630 may be configured to obtain information about the session and the transmission.

The source device 110 may be operative to and/or the source device 110, the processing module 601 and/or the classifying module 640 may be configured to classify a mismatch, identified by the feedback message, into a category based on the information about the session and the transmission as well as the feedback message.

The source device 110 may be operative to and/or the source device 110, the processing module 601 and/or the collecting module 650 may be configured to collect statistics about the mismatch and the category, and/or any further mismatches and any further category(/ies).

The source device 110 may be operative to and/or the source device 110, the processing module 601 and/or the sending module 660 may be configured to send a mismatch message indicating the category.

Figure 7:
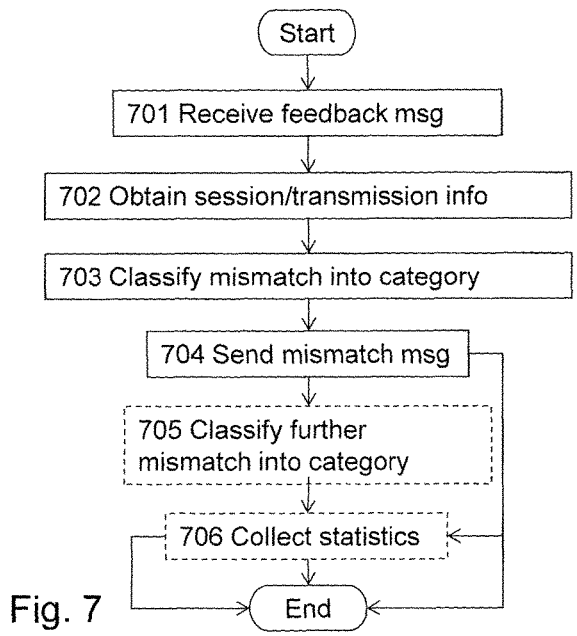
FIG. 7 is a flowchart illustrating embodiments of the method in the analyser.

In FIG. 7, an exemplifying, schematic flowchart of embodiments of the method in the analyser 130 is shown. As mentioned, the analyser 130 performs a method for managing a feedback message for indication of an error in a picture of a CVS, wherein the source device 110 is configured to encode and send the CVS, included in a transmission, to a target device 120 in a session.

As mentioned, the CVS may be a HEVC compliant CVS.

The following actions may be performed in any suitable order.

Action 701

The analyser 130 receives the feedback message and any existing further feedback messages, which indicates that the error has been detected by the target device 120. This action is similar to action 214.

Action 702

The analyser 130 obtains information about the session and the transmission. This action is similar to action 215.

Action 703

The analyser 130 classifies a mismatch, identified by the feedback message, into a category based on the information about the session and the transmission as well as the feedback message. The category may indicate that the source device 110 and the target device 120 are incompatible. This action is similar to action 216.

Action 704

The analyser 130 sends a mismatch message indicating the category. This action is similar to action 217.

Action 705

The analyser 130 may classify a further mismatch, identified by an additional feedback message received by the analyser 130, into a further category based on the additional feedback message, the feedback message and related information about the session and the transmission. This action is similar to action 218.

Action 701

The analyser 130 may collect statistics about the mismatch and the category, and/or the further mismatch and the further category. This action is similar to action 219.

Figure 8:
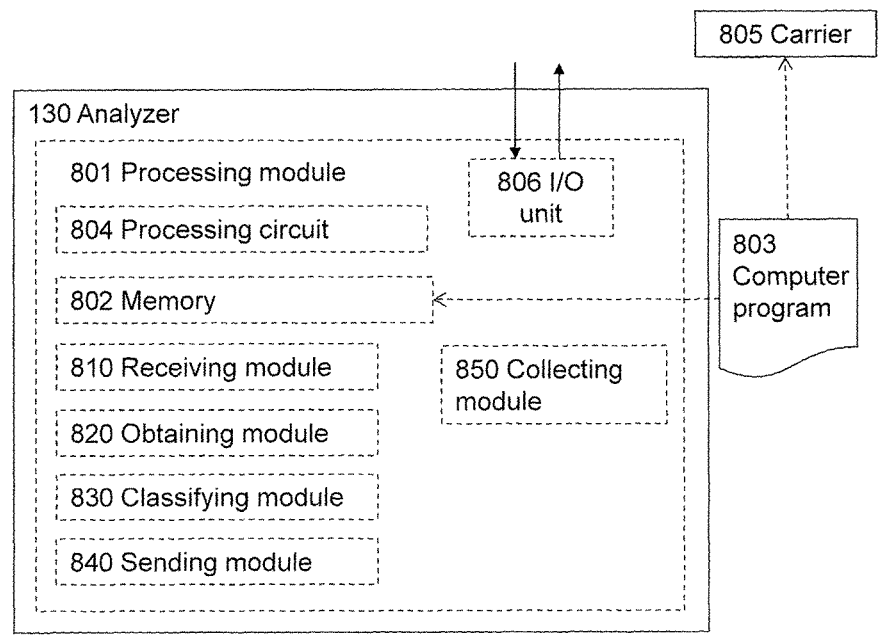
FIG. 8 is a block diagram illustrating embodiments of the analyser.

With reference to FIG. 8, a schematic block diagram of the analyser 130 is shown. The analyser 130 is configured to manage a feedback message for indication of an error in a picture of a CVS, wherein the source device 110 is configured to encode and send the CVS, included in a transmission, to a target device 120 in a session.

As mentioned, the CVS may be a HEVC compliant CVS.

The analyser 130 may comprise a processing module 801, such as a means, one or more hardware modules and/or one or more software modules for performing the methods described herein.

The analyser 130 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the analyser 130 is operative to perform the methods of one or more of FIGS. 2a-2d and/or FIG. 7.

In some other embodiments, the computer readable code units may cause the analyser 130 to perform the method according to one or more of FIGS. 2a-d and/or 7 when the computer readable code units are executed by the analyser 130.

FIG. 8 further illustrates a carrier 805, comprising the computer program 803 as described directly above. The carrier 805 may be one of an electronic signal, an optical signal, a radio signal, and a computer readable medium.

In some embodiments, the processing module 801 comprises an Input/Output (I/O) unit 806, which may be exemplified by a receiving module and/or a sending module as described below when applicable.

In further embodiments, the analyser 130 and/or the processing module 801 may comprise one or more of a receiving module 810, an obtaining module 820, a classifying module 830, a sending module 840 and a collecting module 850 as exemplifying hardware modules. In other examples, the aforementioned exemplifying hardware module may be implemented as one or more software modules.

Therefore, according to the various embodiments described above, the analyser 130 is operative to and/or the analyser 130, the processing module 801 and/or the receiving module 810 is configured to receive the feedback message and any existing further feedback messages, which indicates that the error has been detected by the target device 120.

The analyser 130 is operative to and/or the analyser 130, the processing module 401 and/or the obtaining module 820 is configured to obtain information about the session and the transmission.

The analyser 130 is operative to and/or the analyser 130, the processing module 401 and/or the classifying module 830 is configured to classify a mismatch, identified by the feedback message, into a category based on the information about the session and the transmission as well as the feedback message.

The analyser 130 is operative to and/or the analyser 130, the processing module 401 and/or the classifying module 830, or another classifying module (not shown), is configured to classify a further mismatch, identified by an additional feedback message received by the analyser 130, into a further category based on the additional feedback message, the feedback message and related information about the session and the transmission.

The analyser 130 is operative to and/or the analyser 130, the processing module 401 and/or the sending module 840 is configured to send a mismatch message indicating the category. The category may indicate that the source device 110 and the target device 120 are incompatible.

The analyser 130 may be operative to and/or the analyser 130, the processing module 401 and/or the collecting module 850 may be configured to collect statistics about the mismatch and the category, and/or the further mismatch and the further category.

As is evident from the foregoing, in particular the descriptions with reference to FIGS. 4, 6 and 8, each of the target device 120 and/or the source device 110 may be configured in accordance with the configuration of the analyser 130.

As used herein, the term "processing module" may in some examples refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In these examples, the processing module is thus embodiment by a hardware module. In other examples, the processing module may be embodied by a software module. Any such module, be it a hardware, software or combined hardware-software module, may be a determining means, estimating means, capturing means, associating means, comparing means, identification means, selecting means, receiving means, sending means or the like as disclosed herein. As an example, the expression "means" may be a module or a unit, such as a determining module and the like correspondingly to the above listed means.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A target device configured to manage an error detected in a decoded picture of a coded video sequence (CVS) provided by a source device, wherein the target device comprises:
    memory storing a computer program; and
    a processing circuit operable to execute the computer program to cause the target device to:
        receive a picture of the CVS from the source device;
        receive a first Decoded Picture Hash (DPH) for the picture from a DPH Supplemental Enhancement Information (SEI) message of the CVS;
        calculate a second DPH for the picture;
        detect the error by finding that the first DPH is different from the second DPH;
        in response to detecting the error, obtain information about the session and the transmission;
        classify a mismatch of the first DPH and the second DPH into a category based on the information about the session and the transmission, the category comprising an error introduced in transport or an error caused by encoder-decoder incompatibilities;
        send a mismatch message indicating the category of the mismatch to the source device for resolution of the mismatch;
        send a request to the source device for a picture of a further CVS; and
        in response to the request to the source device, receive the picture of a further CVS, wherein the picture of the further CVS is a second representation that is different from a first representation of the picture of the CVS.

2. The target device according to claim 1, wherein for fetching the pictures of the CVS, the target device comprises an adaptive streaming service client.

3. The target device according to claim 1, wherein the processing circuit is operable to execute the computer program to cause the target device to send a feedback message in real-time to the source device in response to the detection of the error.

4. The target device according to claim 3, wherein the feedback message comprises one or more of an indication indicative of error, an instruction message including a configuration for encoding, a Slice Loss Indication (SLI), a Picture Loss Indication (PLI), an Full Intra Request (FIR), and a Reference Picture Selection Indication (RPSI).

5. The target device according to claim 4, wherein the feedback message comprises the one or more of the indication indicative of error, the SLI, the PLI, the FIR, and the RPSI, and wherein the feedback message is sent using Real-Time Control Protocol (RTCP).

6. The target device according to claim 4, wherein the feedback message comprises the instruction message including the configuration for encoding, and wherein the feedback message is sent using Session Description Protocol (SDP).

7. The target device according to claim 1, wherein the CVS is provided using Real-time Transport Protocol (RTP).

8. The target device according to claim 1 wherein the target device is configured to send, to the source device, an indication indicative of capability to send the feedback message.

9. The target device according to claim 8, wherein the indication indicative of capability is sent using Session Description Protocol (SDP).

10. The target device according to claim 1 wherein the target device is configured to send, to the source device, a request for inclusion, by the source device, of at least one DPH SEI message in the CVS.

11. The target device according to claim 10, wherein the request is sent using Session Description Protocol SDP.

12. The target device according to claim 1 wherein the CVS is a High Efficiency Video Coding (HVEC) compliant CVS.

* * * * *